United States Patent [19]
Hills

[11] Patent Number: 5,765,900
[45] Date of Patent: Jun. 16, 1998

[54] ONE PIECE MAT FOR MOTOR VEHICLES

[76] Inventor: Steven L. Hills, 14032 Light St., Whittier, Calif. 90605

[21] Appl. No.: 902,225

[22] Filed: Jul. 29, 1997

[51] Int. Cl.$^6$ .................................................. B62D 25/20
[52] U.S. Cl. ............................................................ 296/97.23
[58] Field of Search ................................................ 296/97.23

[56] References Cited

FOREIGN PATENT DOCUMENTS

| 1806815 | 5/1970 | Germany | 296/97.23 |
| 221945 | 9/1987 | Japan | 296/97.23 |
| 403213442 | 9/1991 | Japan | 296/97.23 |

*Primary Examiner*—Gray C. Hoge
*Attorney, Agent, or Firm*—Edgar W. Averill, Jr.

[57] ABSTRACT

A one-piece mat for covering the floor of a motor vehicle of the type having two separated front seats and at least one removable back seat. The mat is formed from one piece and can be installed without any cutting by the user. The mat has a squared hourglass shape so that it may cover the front floor, the space between the two separated front seats and the rear floor. The mat has openings for seat brackets and is especially useful for vans.

2 Claims, 2 Drawing Sheets

ONE PIECE MAT FOR MOTOR VEHICLES

BACKGROUND OF THE INVENTION

The field of the invention is motor vehicle flooring and the invention relates more particularly to mats that are placed over the existing equipment carpet in a vehicle.

Most new motor vehicles are supplied with floor mats, one for the driver's side and one for the passenger's side. Such floor mats are useful for protecting the original equipment carpeting under the floor mats. There has been a trend to ever-increasing use of vans having two separated bucket seats. Such vans are often used for transporting children and pets and as a result the carpets are frequently soiled. This reduces the value of the vehicle.

Numerous floor mats have been provided over the years for motor vehicle carpet covering. U.S. Pat. No. 2,505,554 shows an automotive floor mat with holes cut for the pedals and a slit cut to accommodate the drive shaft ridge. The mat is useful only for the front portion of the vehicle. A replacement cover for automobile flooring is shown in U.S. Pat. No. 2,970,860. The drawings show a rear floor carpet and require the buyer to cut the mat to fit his vehicle. A paper templet is provided and the end result is a separate front car mat and rear car mat.

U.S. Pat. No. 4,898,417 shows a structure for covering seat slide legs. The problem faced by the inventor was the unsightly hardware visible in many automobiles and the invention shows a carpet boot for covering such hardware.

U.S. Pat. No. 5,322,335 shows a heavy gauge extruded high density polyethylene floor mat which is attached to the top of the rear of the rear seats which hinge forward in a sport utility vehicle. The heavy plastic mat protects the rear floor when it is being used for transporting things.

The separate front and rear mats commonly used in motor vehicles tend to slide out of place and are inappropriate for the rear area when the rear seats are removed.

BRIEF SUMMARY OF THE INVENTION

It is an object of the present invention to provide a one-piece for covering the floor of motor vehicles having two separated front seats and which covers both the front floor area and the rear floor area in a single piece.

The present invention is for a one-piece mat for covering the floor of motor vehicles of the type having two separated front seats and at least one removable back seat. The one-piece mat is fabricated from one flat piece of carpet and the piece of carpet as supplied to the user does not require any cutting. The carpet is essentially in the shape of a rectangular hourglass having a center line. A front floor portion has a right side portion extending to the right of the center line to a right front edge. A left side portion extends to the left of the center line to a left front edge. The carpet has a front edge extending from the right front edge to the left front edge and includes a cutout extending inwardly from the front edge on both sides of the center line. A narrowed center section is centered on the center line of the carpet and is formed by a pair of side cutouts which side cutouts provide space for the two separated front seats when the carpet is installed in a vehicle. A generally rectangular portion extends outwardly from the narrowed center section and extends outwardly to a rear right side a distance so that it is about aligned with the right front edge and extends outwardly to a rear left side so that it is about aligned with the left front edge and the generally rectangular rear portion has a generally straight rear edge. The rear portion has a plurality of generally rectangular cutouts to accommodate any rear seat brackets.

DESCRIPTION OF THE PREFERRED EMBODIMENTS

Figure 1:
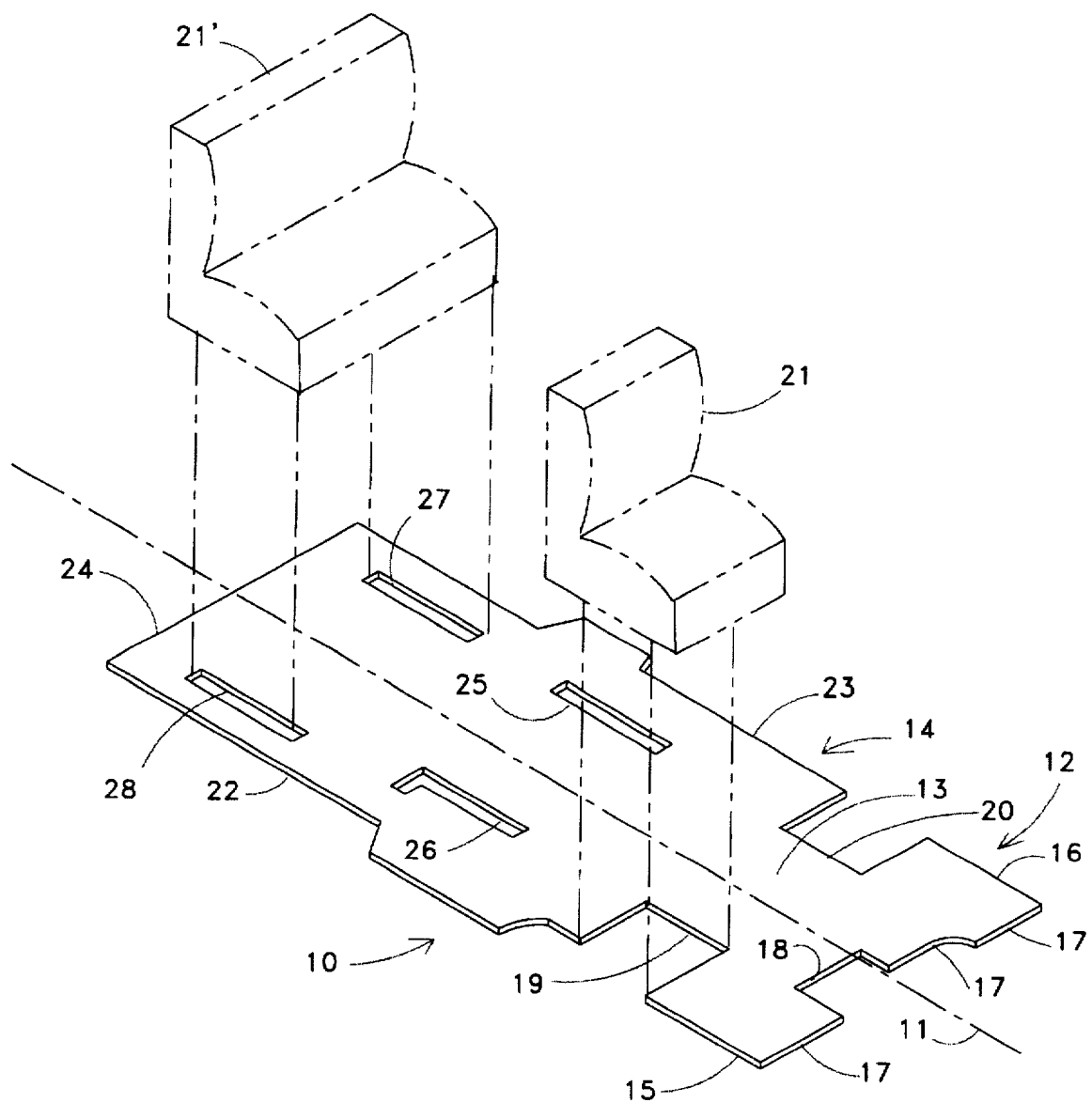
FIG. 1 is a perspective view of the one-piece mat of the present invention showing two seats in phantom view.

The mat of the present invention is shown in FIG. 1 and indicated generally by reference character 10. Mat 10 has a center line 11 and is generally in the shape of a rectangular hourglass having a widened front portion 12, a narrowed center section 13 and a widened rear portion 14.

Widened front portion 12 has a right edge 15, a left edge 16 and a front edge 17. A front cutout 18 extends inwardly from front edge 17. Front cutout 18 provides for a dash center post and for a portion of an engine compartment. A right cutout 19 extends inwardly from right edge 15 and provides room for a right front seat 21 shown in phantom view. A left cutout 20 extends inwardly from the left edge 16 and provides space for a left front seat not shown.

Mat 10 then extends outwardly to a rear right edge 22 and a rear left edge 23. Mat 10 also has a back edge 24. Cutouts are provided which are precut for a particular style of vehicle and positioned so that they accommodate the seat brackets which exist in motor vehicles of the type useful for the mat of the present invention. These seats are removable without the use of tools and merely have a lever which allows the seat to be removed to accommodate cargo. The mat shown in FIG. 1 has four such openings indicated by reference characters 25, 26, 27 and 28. Of course, the shape and positioning of the openings is dictated by the positioning of the hardware. Rear seat 21' is shown in phantom view above openings 27 and 28.

The mat of the present of the present invention is very easy to install even by unskilled persons. One merely needs to remove all of the rear seats which is easily done. The mat which is supplied in a roll is then placed at the back of the vehicle and unrolled and moved so that the openings which are generally rectangular are positioned over the brackets. This is especially easy since the sides of the carpet fit against the sides of the vehicle helping to position it correctly. While the term "generally rectangular" has been used for the openings for the seat brackets, this term is intended to include a shape such as opening 26 which is generally rectangular with a second rectangular cutout. The result of the use of the mat of the present invention is to protect the original equipment carpet and to increase the resale value of the vehicle. When the vehicle is ready to be sold the mat can be removed and the underlying has remained in a like-new and unworn condition. The mat is preferably fabricated from an indoor/outdoor type of carpeting made from polypropylene or other easily cleaned material. The indoor/outdoor carpet is provided with a marine unitary backing to prevent the possibility of moisture penetrating the carpet. It covers over 90% of the surface area of the vehicles and is particularly useful for mini vans, full size vans, cab plus mini trucks, cab plus full size trucks and sport utility vehicles. Because the mat is so large it does not shift around the way smaller mats do.

Figure 2:
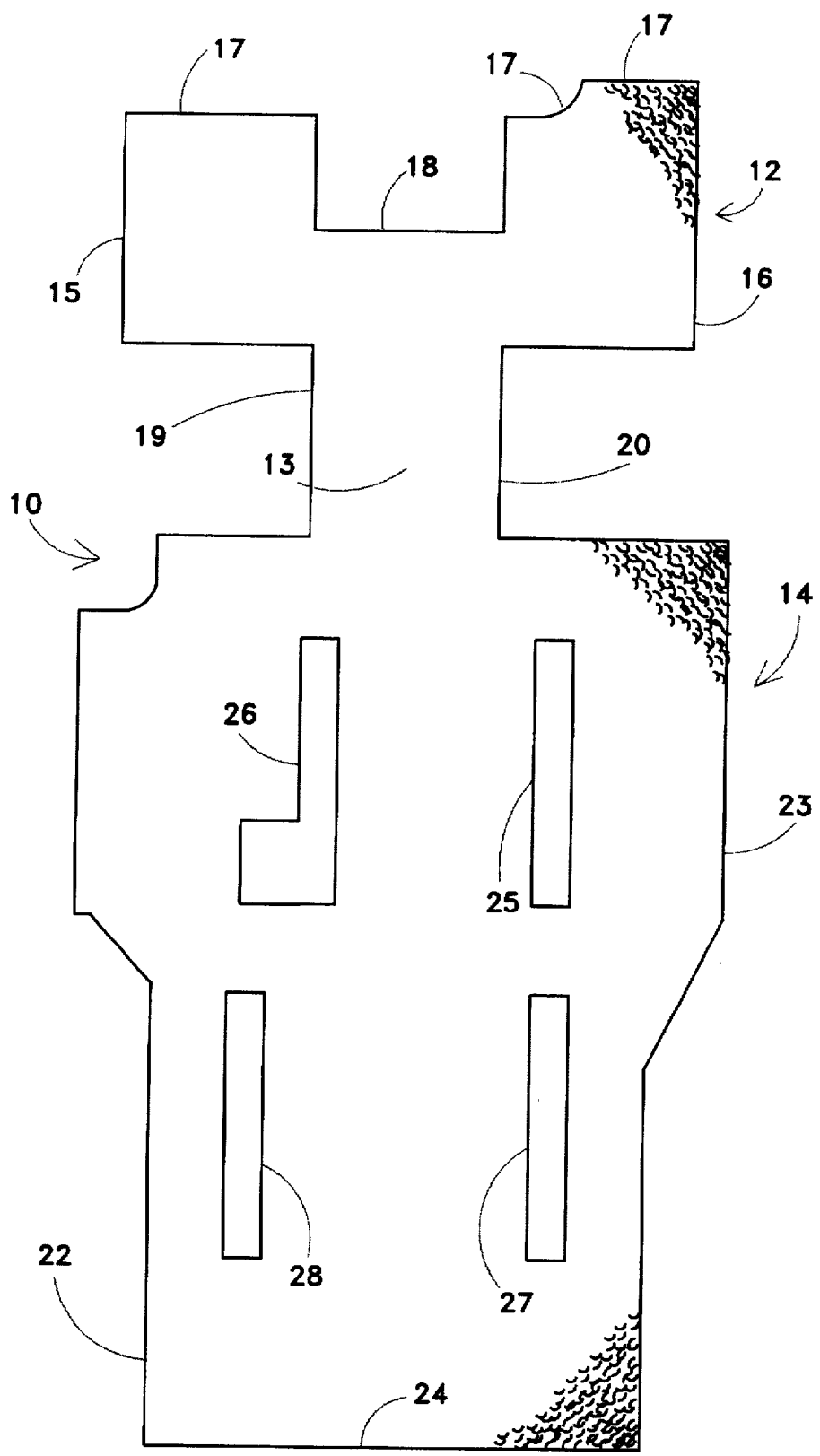
FIG. 2 is a plan view of the underside of the mat of FIG. 1.

FIG. 2 shows one version of the mat of the present invention made for a specific vehicle. It may be readily rolled up and boxed for shipment and is shaped to closely follow the outer shape of the vehicle carpet. Nothing needs to be screwed over the top of the carpet to hold it in place and it merely utilizes the sides of the vehicle for placement.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A one piece mat for covering the floor of motor vehicles of the type having two separated front seats and at least one removable back seat, said one piece mat fabricated from one flat piece of carpet and which does not require any cutting by the user, said carpet being pre-cut for a specific vehicle model and being in the shape of a rectangular hour glass and having a center line, said carpet comprising:

a front floor portion having a right side portion extending to the right of said center line to a right front edge, a left side portion extending to the left of said center line to a left front edge, a front edge extending from the right front edge to the left front edge and having a cut-out extending inwardly from the front edge on both sides of the center line;

a narrowed center section centered on said center line formed by a pair of side cut outs which side cut outs provide space for the two separated front seats when the carpet is installed in the vehicle; and a generally rectangular rear portion extending outwardly from said narrowed center section and extending outwardly to a rear right side a distance so that it is about aligned with the right front edge and extending outwardly to a rear left side so that it is about aligned with the left front edge, said generally rectangular rear portion having a generally straight rear edge and a plurality of generally rectangular cut outs, said cut outs being elongated to accommodate any rear seat brackets.

2. The one piece mat of claim 1 wherein said rear portion has four cut outs.

* * * * *